April 25, 1933. S. B. MOTT 1,906,126
MEANS FOR CONVEYING AND UNPACKING CANS AND THE LIKE
Filed Aug. 17, 1931 4 Sheets-Sheet 1

INVENTOR.
SAMUEL B. MOTT.
BY Lockwood Lockwood
Goldsmith & Galt
ATTORNEYS.

April 25, 1933.    S. B. MOTT    1,906,126
MEANS FOR CONVEYING AND UNPACKING CANS AND THE LIKE
Filed Aug. 17, 1931    4 Sheets-Sheet 2

INVENTOR.
SAMUEL B. MOTT.
BY Lockwood Lockwood
Goldsmith & Galt
ATTORNEYS.

April 25, 1933.    S. B. MOTT    1,906,126
MEANS FOR CONVEYING AND UNPACKING CANS AND THE LIKE
Filed Aug. 17, 1931    4 Sheets-Sheet 3
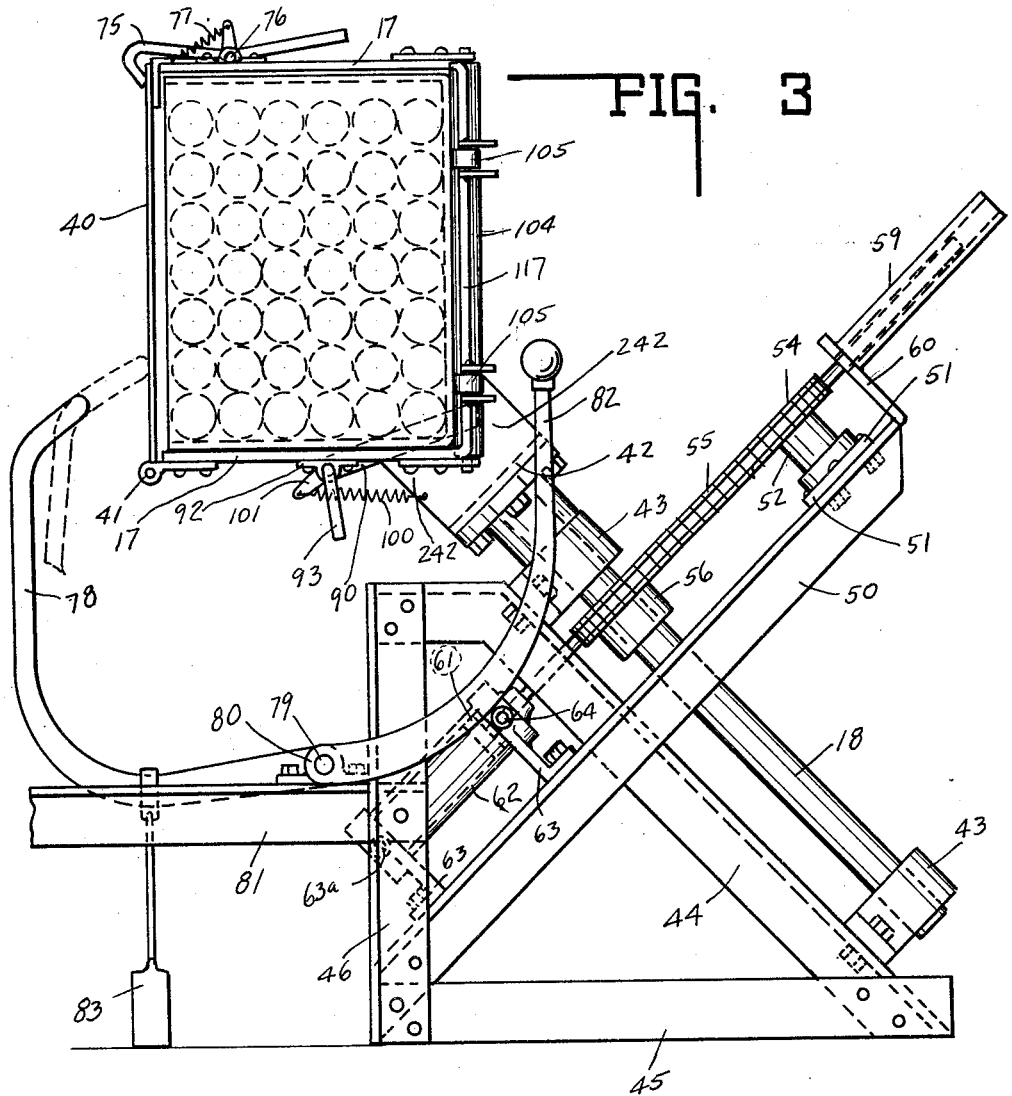
INVENTOR.
SAMUEL B. MOTT.
BY
Lockwood Lockwood Goldsmith & Galt
ATTORNEYS.

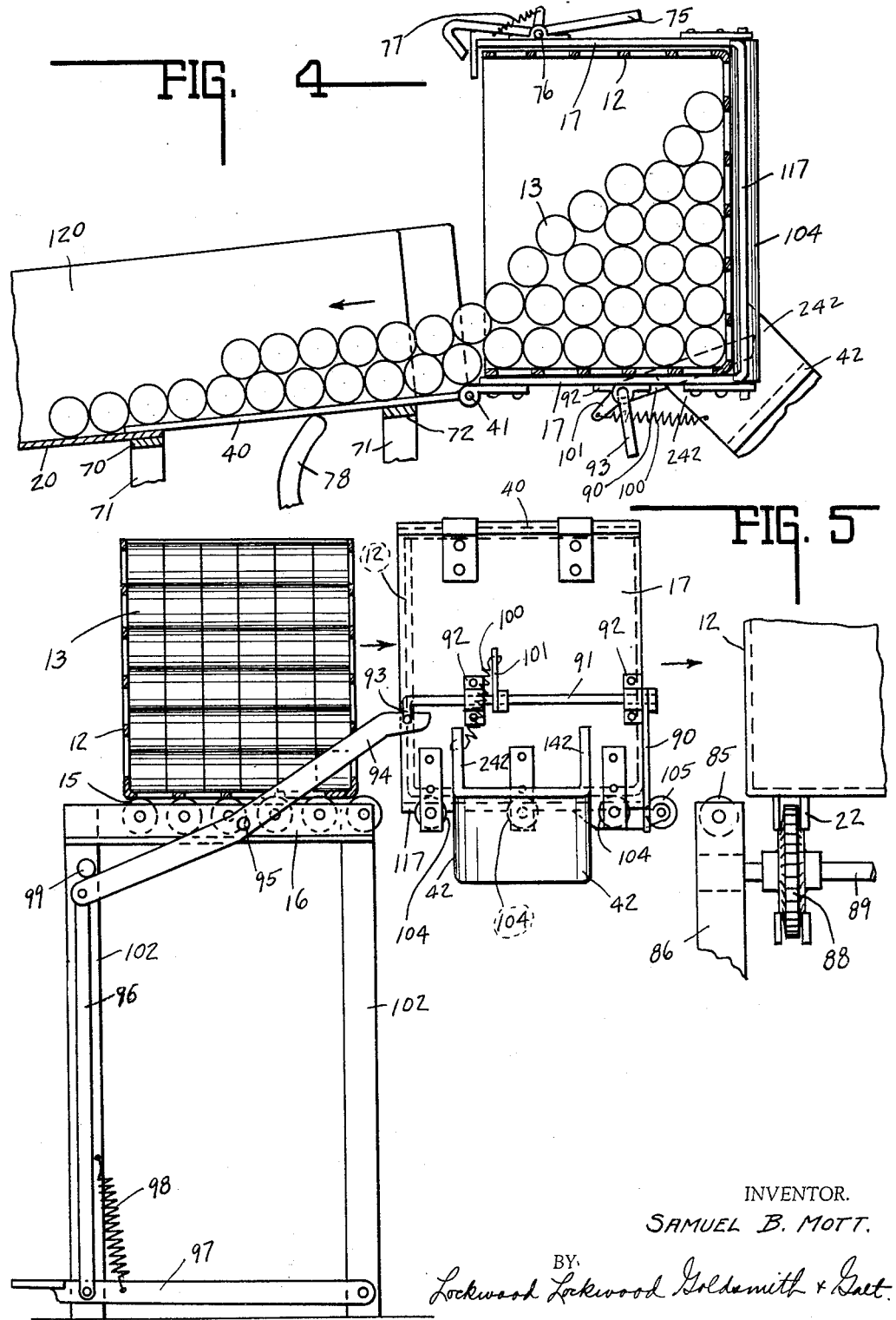

Patented Apr. 25, 1933

1,906,126

UNITED STATES PATENT OFFICE

SAMUEL B. MOTT, OF NOBLESVILLE, INDIANA, ASSIGNOR TO INDIANA CONDENSED MILK COMPANY, OF INDIANAPOLIS, INDIANA, A CORPORATION

MEANS FOR CONVEYING AND UNPACKING CANS AND THE LIKE

Application filed August 17, 1931. Serial No. 557,458.

The objects of this invention are to effect a compact arrangement of parts of a system for conveying and handling cans and like articles, to transfer cans and the like from a basket or other container coming in over a supply conveyer to a parallel reversely directed conveyer with cans leaving the baskets on their sides for subsequent travel and treatment individually, and to utilize the incoming basket or container to the transfer means to push out the previous and emptied basket upon a return conveyer leading to the basket filling end of the system.

One feature of the invention is the combination with a supply conveyer and a can-receiving conveyer parallel, and reversely directed if desired, of means for turning a basket filled with cans and discharging the cans and like articles from the basket individually to the receiving conveyer.

Another feature of the invention is the transfer means or cage having opposite open sides through which to receive and discharge the basket, and means for giving the cage and the basket a turn diagonally for 180°, whereby the open top of the basket is at the discharge side adjacent the end of the conveyer upon which the cans can roll from the basket, and a hinged lid of the transfer cage will be changed from the top to the discharge side and can be opened and turned down over the end of the receiving conveyer as a bridge over which the cans can roll from the basket to said receiving conveyer.

Another feature of the invention is the combination with a basket returning conveyer, and means enabling an incoming basket to the transfer cage to shove the preceding empty basket upon the return conveyer.

The full nature of the invention will be understood from the accompanying drawings and the following description and claims.

Figure 1:
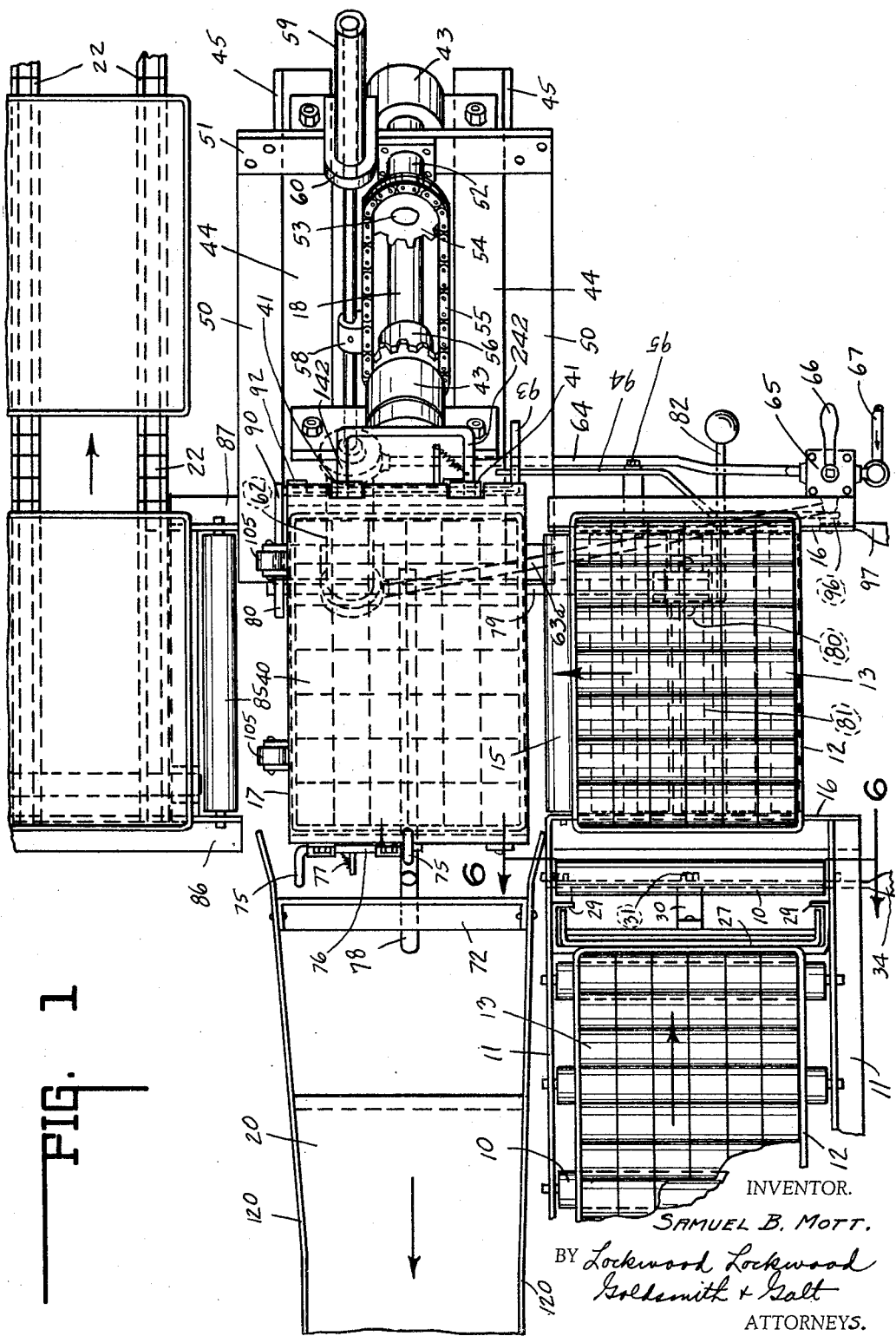
Figure 2:
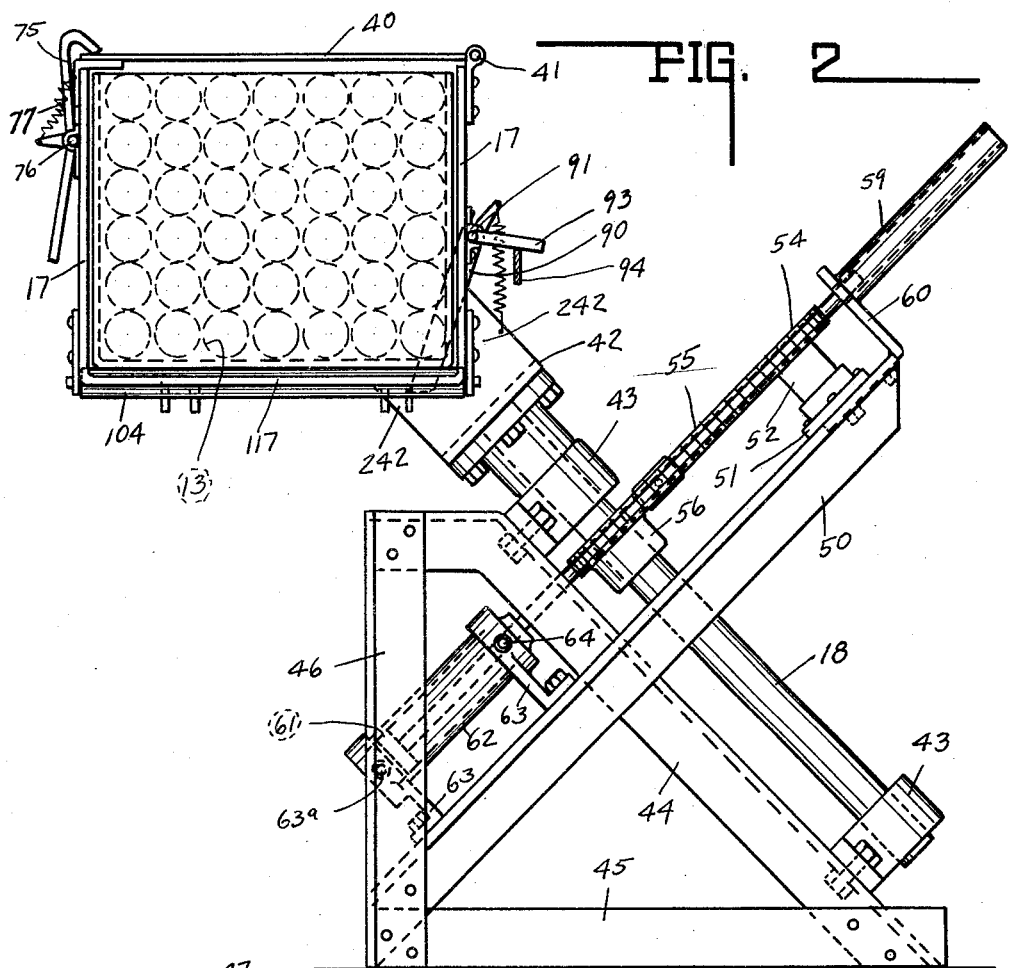
Figure 6:
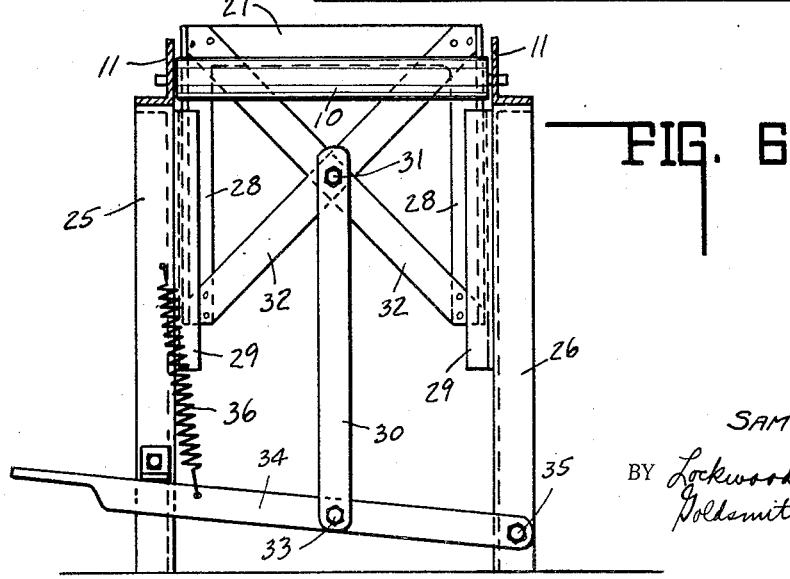

In the drawings, Fig. 1 is a plan view of the portion of the conveyer apparatus to which this invention relates, parts being broken away, and the parts shown in position with the basket-turning means in basket-receiving position. Fig. 2 is a side elevation of the means for turning the basket, in the basket-receiving position the same as Fig. 1. Fig. 3 is a side elevation of the basket-turning means with the basket turned diagonally substantially 180° to discharging position, parts being shown in dotted lines. Fig. 4 is a vertical section through the basket and receiving conveyer with the basket-turning means and other parts shown in side elevation and parts broken away. Fig. 5 is a view of parts of the apparatus in a right-hand elevation, as shown in Fig. 1, parts being omitted and parts broken away. Fig. 6 is a vertical section on the line 6—6 of Fig. 1, showing the stop gate in upward or normal position.

As seen in Fig. 1, this apparatus divides itself into practically five portions. One portion consists of a supply conveyer with parallel rollers 10 and side bars 11 of a roller conveyer for baskets 12 thereon full of cans 13. The next portion is a roller platform consisting of the rollers 15 and frame bars 16 located at the end of the supply conveyer to receive the baskets 12 filled with cans. The rollers 15 of the platform are at right angles to the rollers 10 of the supply conveyer. The third portion consists of a basket-turning means consisting of a three-sided cage 17 secured on the end of a diagonal shaft 18, and means for supporting the same in position for the cage to receive a basket from said roller platform. The fourth portion consists of a receiving conveyer 20 in the form of a chute and beside the supply conveyer 10—11 an oppositely directed relative thereto and in position to receive the cans from the basket as shown in Fig. 4. Finally there is a basket returning conveyer 22 having a pair of chains driven in this particular showing in a direction the reverse of the receiving conveyer and parallel with the supply conveyer. An endless conveyor may be substituted for chute without departing from the invention.

The purpose and function of the apparatus is to receive open top baskets filled with cans and the like from the supply conveyer and move them laterally into the cage for turning the basket, and then turning the cage and basket diagonally 180° so that the open top of the basket and the lid of the cage will be changed from the horizontal position in which the same was received by the cage, to a vertical position, and on the side adjacent to the receiving conveyer that extends in a direction opposite to the feed conveyer, and finally discharging the empty basket from the cage upon a third conveyer for returning the same from the discharging end of the system to the charging end thereof, which latter is not shown herein. In the particular system in which this mechanism is employed, the function of the apparatus is to receive the cans after they have been sterilized or otherwise treated in groups and deliver them to the receiving conveyer that carries them to the distributing system, not shown, where the cans are individually treated such as for labelling and the like and to return the empty baskets to the beginning of the system.

The basket 12, shown in Fig. 1, as it rests on the conveyer 10—11, is open at the top and contains cans lying on their sides and in the same position as when they were in the sterilizing apparatus, not shown. As these baskets are fed in the direction of the arrow shown at the left lower corner of Fig. 1, they can be stopped and temporarily held back by the gate mechanism shown in Fig. 6. As therein shown, the bars 11 are supported on posts or uprights 25 and 26. The gate 27 consists of a horizontal upper bar secured on the upper ends of two downwardly-extending bars 28 that reciprocate vertically in channel guides 29 which are secured to the uprights 25 and 26. Said gate moves vertically between the rollers 10 of the feed conveyer, and it is held upwardly in closing position by a bar 30 which is pivoted at its upper end at 31 to diagonal brace bars 32, and at its lower end it is pivoted at 33 to a foot lever 34 which is pivoted at one end at 35 to the upright 26. The other end of said lever 34 is held upward by a spring 36 which at one end is secured to said lever 34 and at the other end above to the upright 25. This arrangement of spring 36 enables the gate to be held in closed or stopping position. When it is desired to lower the gate out of the path of travel of the basket 12, the operator's foot is applied to the outer end of the lever 34 which depresses the gate; and after the basket passes from the left-hand position shown in Fig. 1 onto the lower platform 15—16, the spring 36 automatically returns the gate to its upward and stopping position. In the event baskets are supplied faster than released to the transfer mechanism, they accumulate in abutting relation at the discharge end of feed conveyer 10—11 and ride thereon until released.

After the basket 12 full of cans reaches its position on the roller platform 15—16, it is moved at a right angle to its movement in the feeding position above described into the basket-turning cage 17. This movement is done by hand by the operator who releases the basket from the feed conveyer. The cage 17 consists of two sides, shown in Fig. 2, and the bottom 117, as shown in Fig. 2. Two opposite sides, therefore, of said cage are open and the top is closed by a metal lid 40 hinged at 41 to one of the sides of the cage, as seen in Fig. 2.

The cage 17—117 is rigidly secured or spot welded to a head 42 made of plate metal that has two side plates 142 and 242, each of which is bifurcated, as shown in Fig. 2. This head is on the obliquely-disposed shaft 18, as seen in Fig. 2, that extends substantially at 45° from vertical and horizontal planes. The cage 17—117 is rectangular with its bottom horizontal and its open sides vertical when in the receiving position shown in Fig. 2. Said shaft 18 is mounted in its inclined position in bearings 43 secured to an inclined angle iron 44 mounted on a base frame member 45 and upright member 46, as seen in Fig. 2. Said bars 44 and 45 are arranged in parallel pairs, as shown in Fig. 1, and they are secured to the floor or other support in rigid position. While the shaft 18 extends at substantially 45°, it should be preferably such that the bottom of the basket in the cage when the latter is in the discharging position, as shown in Fig. 4, inclines downwardly somewhat towards receiver 20 so that the cans will tend to roll out of the basket by gravity.

The means for operating said shaft 18 is shown in Figs. 1 and 2, and includes a frame consisting of a pair of bars 50 inclined in an opposite direction from the bars 44 and at right angles thereto and at their upper ends they are connected by a cross bar 51 and at their lower ends they are connected to the lower part of the vertical frame bars 46, as seen in Fig. 2. There is centrally secured to the cross bar 51, as seen in Fig. 2, a bearing 52 in which is mounted a stub shaft 53 which carries a sprocket 54 on which a sprocket chain 55 operates. At the other end said sprocket chain 55 operates on a similar sprocket 56 secured on shaft 18 for turning the same. The sprocket chain is actuated in opposite directions by a piston rod 57, shown in Fig. 1, on which a clip 58 is pinned or secured, and said clip is also connected with the sprocket chain 55. While the shaft 18 is shown operated by compressed air apparatus, the invention is not limited to that arrangement as said shaft can be turned by hand or any other means such as would occur to any skilled mechanic.

The upper end of the piston rod 57 reciprocates in a tubular guide 59 held in position by an angle plate 60 that is connected with the frame bar 51, as seen in Fig. 2. The piston rod 57 is driven by piston 61, shown by dotted lines in Fig. 2, in an air cylinder 62 carried by brackets 63 which are secured to the frame bars 50. Air reaches the lower end of the cylinder 62, see Figs. 3 and 4, through air pipe 63a and returns through air pipe 64 that are connected with the valve box 65, see Fig. 1, in which a valve is mounted that is operated by a hand lever 66. The same operator can actuate lever 66 after successively actuating lever 34 and pushing basket 12 into the cage. Air is supplied from any suitable source of compressed air to the valve box 66 through a line 67. In the form shown, the oscillation of the shaft 18 180° is effected by the mounting of the piston 61 in the cylinder 62, but the oscillation of the shaft may be limited by any other desired means which would readily occur to any mechanic.

As heretofore stated, the parts when in the position shown in Fig. 1, holds the cage 17—117 in position with the front and rear sides open so as to receive a basket of cans from the roller conveyer 15—16, as the same are pushed by the operator rearward from the position shown in Figs. 1 and 2. When the basket is within the cage 17, the basket is turned 180° by the shaft 18 and compressed air mechanism described. When that operation is ended, the cage and basket are in the position shown in Figs. 3 and 4 with the cage opposite the receiving end of the receiving conveyer 20. This receiving conveyer may be a gravity conveyer in the form of a chute having the bottom 20 and sides 120 supported on a cross bar 70 on a pair of uprights 71 as shown, or may be of the endless type. The sides 120 of this conveyer structure are braced by the bottom bar 72, seen in Figs. 1 and 4.

In the 180° turn of the cage containing the basket, the latter is turned end for end so that the cylindrical cans 10 are lying on their cylindrical sides and the open top of the basket is on the side adjacent the receiving conveyer, as shown in Fig. 4. Said cage movement also brings the lid 40 of the cage from its top and horizontal position, shown in Figs. 1 and 2, to a vertical position with the hinge down and adjacent the end of the receiving conveyer, as seen in Figs. 3 and 4. Said door is normally held closed by a spring latch 75 pivoted at 76 to one side of the cage and held closed by a spring 77. When the latch is opened, the lid 40 will fall down from the position shown in Fig. 3 to that shown in Fig. 4, where its free end overlaps the bottom 20 of the discharge conveyer. This opening movement of the door is rendered relatively slow and is retarded by a bent arm 78 which is secured to a rock shaft 79 mounted in bearings 80 on frame bars 81 secured to the frame bars 46, as seen in Figs. 1 and 3. The shaft 79 is operated or rather rotation is retarded as desired by a hand lever 82, see Figs. 1 and 3 and by the same operation before mentioned. The arm 78 is held in its down position by a weight 83. The door 40 is closed by hand through the lever 82, see Fig. 1, and held closed by the latch 75, when desired. The basket, when in the position shown in Fig. 4 in the system herein of which this apparatus forms a part, discharges its cans by gravity to the receiving end of the receiving conveyer 20.

After the cans have been discharged from one basket, the lid 40 is closed by operating lever 82 and the hand lever 66 is reversed and that returns the cage 17—117 to its normal position, shown in Fig. 1, with the two opposite sides open, so that when the next basket filled with cans is shoved into the cage by the aforementioned operator, the succeeding basket will shove the preceding basket upon the conveyer 22 which returns the empty baskets to the filling end of the conveyer system which is not here shown. To aid in the transfer just described, there is a transfer roller 85 mounted in two frame bars 86 and 87, as seen in Fig. 1. The chain 22 is, in the form herein shown, driven by means not shown, and said chain runs over a sprocket wheel 88 on shaft 89, as seen in Fig. 5.

When the basket filled with cans is shoved into the cage 17—117, it will be stopped by a stop bar 90, as shown in Fig. 5, which is secured on a shaft 91 mounted in bearings 92 on the cage 17—117, and said shaft has at one end a trip arm 93, see Fig. 4, which is engaged and actuated by a lever 94, see Fig. 5, fulcrumed midway between its ends at 95 and operated by a link rod 96 and pedal lever 97. Said lever actuated means is returned to normal by a spring 98 against a stop pin 99, as seen in Fig. 5. The stop 90, shown in Fig. 2, is held in stopping position by a spring 100 connected at one end with the head 42 and at the other end with an arm 101 from the shaft 91. Lever 97 is operated by the aforementioned operator, and, as will be apparent from Fig. 1, this operator will stand facing platform 16 and rollers 15 and operate lever 34 with the left foot, lever 97 with the right foot, lever 66 (valve) with the right hand and lever 82 with the right hand at the appropriate times, and also push with the left hand or both hands, at the appropriate time, the basket from the platform into the cage.

The roller platform is supported on the uprights 102, as shown in Fig. 5, and on one of them the foot lever 97 is fulcrumed at its end, and the spring 98 is connected with the other upright 102 and also the stop pin 99 is on said latter upright. The bottom 117 of the cage 17—117 has three longitudinal rollers 104 secured to it as indicated in Fig. 5, on which a basket rides as it is pushed onto the cage. The cage also has a pair of rollers 105 on the right hand end, as shown in Fig. 5, on which the empty cage rolls as it passes to the roller 85 and the sprocket chain 88 of the return conveyer, as seen in Fig. 1. Before the turning of the cage, these wheels are at the bottom, as seen in Fig. 5, but after rotation, they are at the right hand side, as seen in Fig. 3.

Applicant does not desire to limit his invention to the kind of basket shown herein as the term "basket" in the description and claims is intended to cover any kind of container for cans and like articles; nor to the handling of cans only, as the word "can" in the description and claims is intended to cover any article desired which it is the desire to handle, provided it is cylindrical or substantially so and can assume an upright position or lie on its side. The names "transfer means" and "package turning means" are used to include any kind of cage or other named device adapted to receive baskets and the like and give them the turning movement herein set forth. By "conveyer" is meant any kind of conveyer, whether it be a gravity, roller, mechanically moved, or any other type of conveyer suitable for handling articles shaped substantially like cans.

The invention claimed is:

1. The combination of a filled basket supply conveyer, a receiving conveyer parallel with the supply conveyer, open top baskets and like containers for rows of cylindrical articles, and means at the end of the receiving conveyer for receiving and diagonally turning each basket so that the open top thereof will be at the side of the basket facing the receiving conveyer and the rows of the cylindrical articles changed from vertical to sidewise position for easy discharge of the contents to said receiving conveyer.

2. The combination with a filled basket supply conveyer, a receiving conveyer parallel with and beside the supply conveyer, a transversely directed roller platform at the end of the supply conveyer, and basket turning means rotatably mounted at the end of the receiving conveyer in position to receive in the side thereof from the roller platform open top baskets having rows of cylindrical articles therein and change the baskets to bring the open top thereof to a vertical position facing the receiving conveyer and thereby change the rows of the articles therein from a vertical to a sidewise position to facilitate the self-discharge of the articles in the basket to the receiving conveyer.

3. In combination with a filled basket supply conveyer, a receiving conveyer, a transversely directed roller platform at the end of the supply conveyer, basket turning means rotatably mounted at the end of the receiving conveyer in position to receive in the side thereof a basket from the roller platform, means to cause the discharge of the contents of the basket to the receiving conveyer, a vertically movable gate near the end of the supply conveyer in position to normally stop the basket on said conveyer before reaching the roller platform, yielding means for holding the gate in its normal stopping position, and means for moving the gate away from stopping position.

4. In combination a supply conveyer for open top baskets adapted to receive articles, a receiving conveyer, a basket turning cage of three rigid sides and at the end of the receiving conveyer adapted to receive the baskets successively when moved laterally thereof, and means for diagonally turning the cage with the basket therein so as to position the open top of the basket at the side thereof in the new position adjacent the receiving platform whereby the articles may be discharged therefrom upon said receiving conveyer.

5. The combination of a supply conveyer of open top baskets adapted to receive articles, a receiving conveyer parallel with and adapted to convey articles reversely of said supply conveyer and with its receiving end located near and beside the end of the supply conveyer, a transversely directed roller platform at the end of the supply conveyer, a basket turning cage at the end of the receiving conveyer and adjacent to the roller platform in position to receive a basket therefrom, and means for diagonally turning the cage so as to bring the open top of the basket at the side thereof adjacent the receiving conveyer, whereby the articles may be discharged therefrom upon said conveyer.

6. The combination of a supply conveyer of open top baskets adapted to receive articles, a receiving conveyer parallel with and adapted to convey articles reversely of said supply conveyer and with its receiving end located near and beside the end of the supply conveyer, a transversely directed roller platform at the end of the supply conveyer, a basket turning cage at the end of the receiving conveyer and adjacent to the roller platform and positioned to receive a basket therefrom, said cage being open on opposite sides to receive the basket from the platform and discharge the basket when empty from the cage at the opposite side of the roller platform, and means for diagonally turning the cage so as to bring the open top of the basket at the side thereof in the new position and adjacent the receiving conveyer whereby the articles may be discharged therefrom upon said conveyer.

7. In combination a supply conveyer for open top baskets adapted to receive articles, a receiving conveyer, a basket turning cage at the end of the receiving conveyer adapted to receive the baskets successively, and a single means for simultaneously and diagonally turning the cage as described so as to position the open top of the basket at the side thereof in the new position adjacent the receiving conveyer whereby the articles may be discharged thereto.

8. The combination of an open top basket and the like adapted to contain articles, a filled supply basket conveyer for open top filled baskets, a receiving conveyer, a roller platform conveyer in position to receive a basket from the supply conveyer, a cage with a hinged lid thereon and with an open side adjacent to the end of the roller platform in position to receive a basket therefrom, and means for diagonally turning the cage to bring the hinged lid of the cage and the open top of the basket in position to face the receiving conveyer, whereby when the hinged lid is turned down upon the receiving conveyer, the articles can roll from the basket down upon said conveyer.

9. The combination of an open top basket and the like adapted to contain articles, a conveyer for open top filled baskets, a receiving conveyer, a roller platform in position to receive baskets from the supply conveyer, a cage with a hinged lid thereon and with two opposite sides of the cage open, one open side being adjacent the end of the roller platform in position to receive a basket therefrom, the opposite open side permitting the discharge of the basket when empty, means for diagonally turning the cage to bring the hinged lid of the cage and the open top of the basket in position to face the receiving conveyer, the hinging of the top of the cage being positioned so that it will be positioned at the bottom when the cage is turned whereby when the hinged lid is turned down it will constitute a discharge whereby the articles may roll from the basket upon said receiving conveyer, and a releasable catch for securing the top of the door to the cage for retaining the articles in the cage and basket until the catch is released.

10. In combination a supply conveyer for open top baskets adapted to receive articles, a receiving conveyer, a basket turning cage at the end of the receiving conveyer adapted to receive the baskets successively, a single means for simultaneously diagonally turning the cage as described so as to position the open top of the basket at the side thereof in the new position adjacent the receiving conveyer whereby the articles may be discharged thereto, and removable means on the cage for limiting the movement of the basket into the cage.

11. In combination a supply conveyer for open top baskets adapted to receive articles, a receiving conveyer, a basket turning cage at the end of the receiving conveyer adapted to receive the baskets successively, a single means for simultaneously diagonally turning the cage as described so as to position the open top of the basket at the side thereof in the new position adjacent the receiving conveyer whereby the articles may be discharged thereto, stop means pivoted on the cage adapted to stop the movement of the basket on the cage, a spring for holding said stop in stopping position, and means for maintaining the stop into non-stopping position.

12. The combination of a supply conveyer for open top baskets adapted to receive articles, a receiving conveyer, a basket turning cage at the end of the receiving conveyer adapted to receive the baskets successively, and means for diagonally turning the cage so as to bring the open top of the basket at the side thereof adjacent the receiving conveyer whereby the articles may be discharged therefrom upon said receiving conveyer, said cage turning means including a frame, a shaft mounted in the bearings on said frame obliquely and substantially at forty five degrees from the horizontal and vertical and at its upper end secured to said cage at its lower corner midway between the sides thereof, and means for turning the shaft substantially one hundred eighty degrees and reversing the same.

13. The combination of a supply conveyer for open top baskets adapted to receive articles, a receiving conveyer, a basket turning cage at the end of the receiving conveyer adapted to receive the baskets successively, and means for diagonally turning the cage so as to bring the open top of the basket at the side thereof adjacent the receiving conveyer whereby the articles may be discharged therefrom upon said receiving conveyer, said cage turning means including a frame, a shaft mounted in the bearings on said frame obliquely and substantially at forty five degrees from the horizontal and vertical and at its upper end secured to said cage at its lower corner midway between the sides thereof, a sprocket secured to said shaft, the frame extending transversely of said shaft, another sprocket secured to one end of said frame, a sprocket chain on said sprockets, and means for giving the chain limited forward movement to turn the shaft substantially one hundred eighty degrees.

14. The combination of a supply conveyer for open top baskets adapted to receive articles, a receiving conveyer, a basket turning cage at the end of the receiving conveyer adapted to receive the baskets successively, and means for diagonally turning the cage so as to bring the open top of the basket at the side thereof adjacent the receiving conveyer whereby the articles may be discharged therefrom upon said receiving conveyer, said cage turning means including a frame, a shaft mounted in the bearings on said frame obliquely and substantially at forty five degrees from the horizontal and vertical and at its upper end secured to said cage at its lower corner midway between the sides thereof, a sprocket secured to said shaft, the frame extending transversely of said shaft, another sprocket secured to one end of said frame, a sprocket chain on said sprockets, an air cylinder on one end of said last mentioned frame, and a piston in the cylinder having a sprocket that will give the shaft a turning movement substantially of one hundred eighty degrees.

15. The combination of an open top basket and the like adapted to contain articles, a filled supply basket conveyer for open top filled baskets, a receiving conveyer, a roller platform conveyer positioned to receive a basket from the supply conveyer, a cage with a hinged lid thereon and with an open side adjacent to the end of the roller platform in position to receive a basket therefrom, means for holding the hinged lid closed which means is adapted to yield and permit the lid to open from pressure of the articles in the basket against the lid, and means for diagonally turning the cage to bring the hinged lid of the cage and the open top of the basket in position to face the receiving conveyer, whereby when the hinged lid is turned down on the receiving conveyer, the articles can roll from the basket down upon said conveyer.

16. The combination of an open top basket and the like adapted to contain articles, a filled supply basket conveyer for open top filled baskets, a receiving conveyer, a roller platform conveyer in position to receive a basket from the supply conveyer, a cage with a hinged lid thereon and with an open side adjacent to the end of the roller platform and positioned to receive a basket therefrom, means for retarding the opening movement of the hinged lid closed but which is adapted to yield and permit the lid to open from pressure of the cans in the basket against the lid, a weight for normally holding said retarding means out of engagement with said lid and before it begins to open, and a hand lever means for moving said retarding means into lid closing position, and means for diagonally turning the cage to bring the hinged lid of the cage and the open top of the basket in position to face the receiving conveyer and the retarding means, whereby when the hinged lid is turned down on the receiving conveyer, the articles can roll from the basket down upon said receiving conveyer.

17. The combination of a supply conveyer for open top baskets adapted to receive articles, a receiving conveyer parallel with and adapted to convey articles reversely of said supply conveyer and with its receiving end located near and beside the end of the supply conveyer, and a transversely directed roller platform at the end of the supply conveyer, a basket turning cage at the end of the receiving conveyer and adjacent to the roller platform and positioned to receive a basket therefrom, removable means on the cage for limiting the movement of the basket into the cage, means for diagonally turning the cage so as to bring the open top of the basket at the side thereof adjacent the receiving conveyer whereby the articles may be discharged therefrom upon said conveyer and for returning the cage into its original position, and pedal operated means for releasing the cage.

In witness whereof, I have hereunto affixed my signature.

SAMUEL B. MOTT.